(12) United States Patent
Banti et al.

(10) Patent No.: US 9,852,402 B2
(45) Date of Patent: *Dec. 26, 2017

(54) PERFORMING OPERATIONS ON DELETED ITEMS USING DELETED PROPERTY INFORMATION

(75) Inventors: Edward Thomas Banti, Seattle, WA (US); Selvaraj Nalliah, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/330,081

(22) Filed: Dec. 19, 2011

(65) Prior Publication Data

US 2013/0159485 A1 Jun. 20, 2013

(51) Int. Cl.
*G06F 15/173* (2006.01)
*G06Q 10/10* (2012.01)

(52) U.S. Cl.
CPC .................... *G06Q 10/107* (2013.01)

(58) Field of Classification Search
CPC ..... H04L 51/046; H04L 51/22; G06Q 10/107; G06Q 10/1093; G06F 11/1458; G06F 11/1469

See application file for complete search history.

(56) References Cited

U.S. PATENT DOCUMENTS

| | | |
|---|---|---|
| 5,555,346 A | 9/1996 | Gross et al. |
| 5,890,163 A | 3/1999 | Todd |
| 6,311,210 B1 * | 10/2001 | Foladare et al. ............. 709/206 |
| 7,216,114 B2 | 5/2007 | Hendricks |
| 7,558,928 B1 | 7/2009 | DeVos |
| 7,676,689 B1 | 3/2010 | Shioyama et al. |
| 7,783,706 B1 | 8/2010 | Robinson |
| 7,970,842 B2 | 6/2011 | Cama |
| 8,332,442 B1 | 12/2012 | Greene |

(Continued)

FOREIGN PATENT DOCUMENTS

| | | |
|---|---|---|
| CN | 101188579 A | 5/2008 |
| CN | 101287190 A | 10/2008 |

(Continued)

OTHER PUBLICATIONS

Outlook 2003—Recover Deleted Items.*

(Continued)

*Primary Examiner* — Abdullahi E Salad

(57) ABSTRACT

Deleted property information relating to deleting an item, such as an electronic message, is stored for later use. The stored deleted property information may relate to one or more different properties that are associated with the deletion of the item, such as: a time when the item was deleted, a device from which item was deleted, a device on which the item was stored when deleted, a location of a user where the item was deleted, an application associated with the item, and the like. The deleted property information may be used to perform various operations. For example, deleted items may be sorted using the deleted item property information (e.g. time of deletion, device, location, application), rules may be created to use the deleted property information, deleted items may be restored based on the deleted property information, and the like.

20 Claims, 9 Drawing Sheets

(56) References Cited

U.S. PATENT DOCUMENTS

| | | | |
|---|---|---|---|
| 8,645,456 B2* | 2/2014 | Li et al. | 709/202 |
| 2002/0083064 A1 | 6/2002 | Davis et al. | |
| 2002/0089543 A1 | 7/2002 | Ostergaard | |
| 2002/0163539 A1 | 11/2002 | Srinivasan | |
| 2002/0165898 A1 | 11/2002 | Duffy et al. | |
| 2002/0167905 A1* | 11/2002 | Wenzel et al. | 370/249 |
| 2003/0033271 A1 | 2/2003 | Hendricks | |
| 2005/0004978 A1* | 1/2005 | Reed et al. | 709/203 |
| 2005/0004989 A1 | 1/2005 | Satterfield | |
| 2005/0015451 A1 | 1/2005 | Sheldon | |
| 2005/0177869 A1 | 8/2005 | Savage | |
| 2005/0234943 A1 | 10/2005 | Clarke | |
| 2005/0251555 A1 | 11/2005 | Little, II | |
| 2006/0010221 A1 | 1/2006 | Srinivasan | |
| 2006/0031357 A1 | 2/2006 | Misra et al. | |
| 2006/0143274 A1 | 6/2006 | Schulz | |
| 2006/0218233 A1 | 9/2006 | Greve et al. | |
| 2006/0235933 A1 | 10/2006 | Baluja | |
| 2006/0282784 A1 | 12/2006 | Taylor | |
| 2006/0288044 A1* | 12/2006 | Kashiwagi | G11B 27/034 |
| 2007/0022213 A1 | 1/2007 | Fahmy | |
| 2007/0028063 A1 | 2/2007 | Hars | |
| 2007/0064899 A1 | 3/2007 | Boss | |
| 2007/0077925 A1 | 4/2007 | Hiyama | |
| 2007/0078938 A1 | 4/2007 | Hu | |
| 2007/0192416 A1 | 8/2007 | Gupta | |
| 2007/0208780 A1 | 9/2007 | Anglin | |
| 2008/0010350 A1 | 1/2008 | Chen | |
| 2008/0027909 A1 | 1/2008 | Gang et al. | |
| 2008/0075056 A1* | 3/2008 | Thome | 370/342 |
| 2008/0095336 A1 | 4/2008 | Tysowski | |
| 2008/0177850 A1 | 7/2008 | Piccinini | |
| 2008/0189259 A1 | 8/2008 | Kapur | |
| 2008/0294730 A1 | 11/2008 | Oral et al. | |
| 2008/0301245 A1 | 12/2008 | Estrada et al. | |
| 2008/0305813 A1 | 12/2008 | Rao | |
| 2008/0307000 A1 | 12/2008 | Paterson et al. | |
| 2008/0313296 A1 | 12/2008 | Muller | |
| 2008/0320417 A1 | 12/2008 | Begley | |
| 2009/0024668 A1 | 1/2009 | Bildhaeuser | |
| 2009/0024952 A1 | 1/2009 | Brush et al. | |
| 2009/0089391 A1 | 4/2009 | Garrett | |
| 2009/0144392 A1 | 6/2009 | Wang et al. | |
| 2009/0144535 A1 | 6/2009 | Lin | |
| 2009/0164637 A1 | 6/2009 | Tanimoto | |
| 2009/0182819 A1 | 7/2009 | Krantz | |
| 2009/0248602 A1 | 10/2009 | Frazier | |
| 2010/0082751 A1* | 4/2010 | Meijer | G06F 15/16 709/206 |
| 2010/0145918 A1 | 6/2010 | Stata | |
| 2010/0146056 A1 | 6/2010 | Consul | |
| 2010/0149300 A1* | 6/2010 | Zubas et al. | 348/14.06 |
| 2010/0169429 A1 | 7/2010 | O'Sullivan | |
| 2010/0281141 A1* | 11/2010 | Morohashi | 709/219 |
| 2011/0010182 A1 | 1/2011 | Turski | |
| 2011/0040730 A1 | 2/2011 | Belea | |
| 2011/0055294 A1 | 3/2011 | Noma | |
| 2011/0196892 A1 | 8/2011 | Xia | |
| 2011/0213845 A1 | 9/2011 | Logan | |
| 2011/0246418 A1 | 10/2011 | Piwonka | |
| 2011/0255672 A1 | 10/2011 | Moore | |
| 2011/0261395 A1 | 10/2011 | Kim | |
| 2011/0296043 A1 | 12/2011 | Sutton | |
| 2012/0092346 A1 | 4/2012 | Ording et al. | |
| 2012/0124507 A1 | 5/2012 | Paterson | |
| 2012/0136945 A1 | 5/2012 | Lee | |
| 2012/0149350 A1 | 6/2012 | Fan et al. | |
| 2012/0259927 A1 | 10/2012 | Lockhart | |
| 2012/0324002 A1 | 12/2012 | Chen | |
| 2013/0041912 A1 | 2/2013 | Arora | |
| 2013/0110992 A1* | 5/2013 | Ravindra et al. | 709/220 |
| 2016/0337298 A1 | 11/2016 | Nalliah | |

FOREIGN PATENT DOCUMENTS

| | | |
|---|---|---|
| CN | 101340398 A | 1/2009 |
| CN | 1700341 A | 3/2010 |
| CN | 101729442 A | 6/2010 |
| CN | 101097577 B | 12/2010 |
| CN | 102067107 A | 5/2011 |
| CN | 102148770 A | 8/2011 |
| CN | 102231735 A | 11/2011 |
| CN | 102238107 A | 11/2011 |
| EP | 2337276 A1 | 6/2011 |
| KR | 10-2009-0103594 | 10/2009 |
| KR | 10-2009-0121760 | 11/2009 |
| RU | 2374681 | 11/2009 |
| TW | I346879 | 8/2011 |
| WO | 2010068741 | 3/2011 |

OTHER PUBLICATIONS

Teach Yourself Windows 98 Visually, © 1998 by MaranGraphics Inc. Published by IDG Books Worldwide Inc. p. 91.*

The Productivity Hub; "Use Outlook Reading Pane without marking messages as read"; May 13, 2010; 1 pg.

International Search Report dated Mar. 27, 2013, in PCT/US2012/068843.

International Search Report dated Mar. 29, 2013, in PCT/US2012/069033.

Office Action dated Apr. 10, 2013, in U.S. Appl. No. 13/330,053.

"Configuring Zoho Mail Add on", Retrieved on: Oct. 7, 2011, Available at: http://zohocrm.wiki.zoho.com/Configuring-Zoho-Mail-Addon.html.

"How do I share a mail folder, other than my inbox, in Exchange?", Retrieved on: Oct. 7, 2011, Available at: http://www.inf.aber.ac.uk/advisory/faq/507.

Elkins, M.; "The Mutt E-Mail Client", Retrieved on: Oct. 7, 2011, Available at: http://www.mutt.org/doc/manual/manual.html.

Kerio.com; "Folder Administration", Retrieved on: Oct. 4, 2011, Available at: http://manuals.kerio.com/kmsug/en/sect-folders.html.

Lux Scientiae, Incorporated; "Share Email and Share Folders", Retrieved on: Oct. 7, 2011, Available at: http://luxsci.com/extranet/info/sharing.html.

Migration2007; "Email Migration 2007—Outlook Web Access"; accessed Oct. 5, 2011 at http://migration2007.wiki.otago.ac.nz/Outlook_Web_Access; 16 pgs.

Mimosa Systems; "NearPoint for Microsoft Exchange Server"; 2010; accessed Oct. 4, 2011 at http://www.polk-fl.net/staff/technology/helpdesk/documents/EA-UserGuide.pdf; 78 pgs.

Osuna, A., et al.; "Microsoft Exchange Recovery Using N series Snapshots"; IBM; Jul. 7, 2008; 16 pgs.

SearchExchange.com; "Email, Messaging and Collaboration Clients"; accessed Oct. 5, 2011 at http://searchexchange.techtarget.com/feature/Exchange-Server-backup-and-recovery-FAQs; 21 pgs.

Shareo.com; "ShareO for Microsoft Outlook", Retrieved on: Oct. 7, 2011, Available at: http://www.shareo.com/.

Sharewareconnection.com; "Recovery My Email for Outlook Express"; accessed Oct. 5, 2011 at http://www.sharewareconnection.com/recovery-my-email-for-outlook-express.htm; 3 pgs.

SonicWALL; "SonicWALL Recovery Manager for Exchange 4.9"; Mar. 18, 2011; 26 pgs.

Ventia Pty Limited; "DeskNow", Published on: Dec. 29, 2006, Available at: http://www.desknow.com/downloads/DeskNow%20-%20User%20Manual.pdf.

Web Developers Notes; "Outlook Express Inbox Folders—Sorting and Organizing Your Emails", Retrieved on: Oct. 5, 2011, Available at: http://www.webdevelopersnotes.com/tips/internet/outlook_express_inbox_folders.php.

Williams, R.; "A Simple Useful Modification to MS Outlook's Deleted Items Folder"; TechBetter Jan. 17, 2008; accessed Oct. 5, 2011 at http://www.accountingweb.com/item/104487; 3 pgs.

U.S. Appl. No. 13/330,053, filed Dec. 19, 2011, entitled "Stealth mode for interacting with electronic messages"; Banti, et al.

U.S. Appl. No. 13/330,114, filed Dec. 19, 2011, entitled "Sharing and transferring message content between users"; Nalliah, et al.

(56) References Cited

OTHER PUBLICATIONS

U.S. Appl. No. 13/330,131, filed Dec. 19, 2011, entitled "Restoring deleted items with context"; Nalliah, et al.
Office Action dated Jul. 11, 2013, in U.S. Appl. No. 13/330,114.
Office Action dated Jul. 11, 2013, in U.S. Appl. No. 13/330,131.
Office Action dated Feb. 13, 2014, in U.S. Appl. No. 13/330,131, 36 pgs.
Office Action dated Jan. 3, 2014, in U.S. Appl. No. 13/330,114, 32 pgs.
U.S. Appl. No. 13/330,053, Amendment and Response filed Mar. 21, 2014, 13 pgs.
U.S. Appl. No. 13/330,053, Amendment and Response filed Jul. 10, 2013, 9 pgs.
U.S. Appl. No. 13/330,053, Office Action dated Oct. 21, 2013, 13 pgs.
U.S. Appl. No. 13/330,114, Amendment and Response filed Dec. 11, 2013, 9 pgs.
U.S. Appl. No. 13/330,131, Amendment and Response filed Jan. 9, 2014, 10 pgs.
U.S. Appl. No. 13/330,114, Amendment and Response filed Apr. 3, 2014, 12 pgs.
U.S. Appl. No. 13/330,131, Amendment and Response filed May 8, 2014, 14 pgs.
U.S. Appl. No. 13/330,053, Office Action dated Jul. 17, 2014, 14 pgs.
U.S. Appl. No. 13/330,114, Office Action dated Oct. 2, 2014, 31 pgs.
"Zimbra Web Client User Guide", Dec. 1, 2009, located at: http://files.zimbra.com/website/docs/ZWC%20End%20User%20Guide%20for%206.0.pdf, 19 pgs.
U.S. Appl. No. 13/330,131, Office Action dated Oct. 9, 2014, 25 pgs.
U.S. Appl. No. 13/330,081, Office Action dated Jan. 22, 2015, 11 pgs.
"Outlook 2003—Recover Deleted Items", obtained online on Dec. 23, 2014 at: http://www.Ise.ac.uk/intranet/LSEServices/IMT/guides/softwareGuides/office2003outloo . . . , 3 pgs.
U.S. Appl. No. 13/330,053, Amendment and Response filed Oct. 17, 2014, 13 pgs.
U.S. Appl. No. 13/330,114, Amendment and Response filed Jan. 2, 2015, 12 pgs.
Chinese 1st Office Action in Application 201210552294.X, dated Jan. 26, 2015, 14 pgs.
U.S. Appl. No. 13/330,053, Amendment and Response filed May 11, 2015, 12 pgs.
U.S. Appl. No. 13/330,053, Office Action dated Jun. 17, 2015, 12 pgs.
U.S. Appl. No. 13/330,114, Office Action dated Jun. 10, 2015, 30 pgs.
European Extended Search Report in Application 12861004.5, dated Jul. 3, 2015, 7 pgs.
U.S. Appl. No. 13/330,131, Office Action dated Jun. 25, 2015, 27 pgs.
European Communication in Application 12858774.8, dated Jun. 18, 2015, 1 page.
European Extended Search Report in Application 12858774.8, dated May 13, 2015, 9 pgs.
Ramendik, Mikhail, "The FreeDesktop.org Trash Specification", Apr. 12, 2005, http://www.ramendik.ru/docs/trashpec.html, 10 pgs.
European Communication in Application 12861004.5, dated Jul. 21, 2015, 1 page.
Chinese 1st Office Action and Search Report in Application 201210552358.6, dated Aug. 3, 2015, 12 pgs.
U.S. Appl. No. 13/330,131, Amendment and Response filed May 4, 2015, 13 pgs.
Chinese 2nd Office Action in Application 201210552294.X, dated Oct. 10, 2015, 11 pgs.
U.S. Appl. No. 13/330,053, Amendment and Response filed Jan. 4, 2016, 11 pgs.
U.S. Appl. No. 13/330,053, Amendment and Response filed Aug. 28, 2015, 11 pgs.
U.S. Appl. No. 13/330,053, Office Action dated Oct. 2, 2015, 12 pgs.
U.S. Appl. No. 13/330,114, Office Action dated Oct. 9, 2015, 36 pgs.
U.S. Appl. No. 13/330,114, Amendment and Response filed Sep. 10, 2015, 13 pgs.
U.S. Appl. No. 13/330,131, Amendment and Response filed Sep. 25, 2015, 12 pgs.
U.S. Appl. No. 13/330,131, Office Action dated Oct. 19, 2015, 30 pgs.
U.S. Appl. No. 13/330,114, Office Action dated Mar. 17, 2017, 17 pgs.
Mexican Office Action in Application MX/a/2014/007162, dated Jan. 25, 2017, 5 pgs.
U.S. Appl. No. 13/330,114, Amendment and Response filed Jan. 9, 2017, 16 pages.
Japanese Notice of Allowance in Application 2014-549127, dated Dec. 15, 2016, 3 pages. (No English Translation.).
Russian Notice of Allowance in Application 2014124929, dated Dec. 5, 2016, 9 pages. (No English Translation.).
Chinese Office Action in Application 201210552294.X, dated Nov. 14, 2016, 11 pages.
European Office Action in Application 12858774.8, dated Jan. 5, 2017, 9 pages.
Chinese 3rd Office Action in Application 201210552294.X, dated Apr. 22, 2016, 17 pgs.
Chinese Notice of Allowance in Application 201210552358.6, dated Aug. 5, 2016, 3 pgs.
U.S. Appl. No. 13/330,114, Amendment and Response filed Jul. 18, 2016, 15 pgs.
U.S. Appl. No. 13/330,114, Office Action dated Sep. 8, 2016, 25 pgs.
U.S. Appl. No. 13/330,131, Notice of Allowance dated Aug. 19, 2016, 5 pages.
U.S. Appl. No. 13/330,053, Office Action dated Mar. 7, 2016, 12 pages.
U.S. Appl. No. 13/330,114, Amendment and Response filed Feb. 9, 2016, 17 pages.
U.S. Appl. No. 13/330,114 Office Action dated Mar. 17, 2016, 37 pages.
Taiwan Notice of Allowance in Application 101140108 dated Mar. 17, 2016, 4 pages.
U.S. Appl. No. 13/330,131, Amendment and Response filed Jan. 19, 2016, 14 pages.
U.S. Appl. No. 13/330,131, Notice of Allowance dated Mar. 15, 2016, 14 pages.
Chinese 2nd Office Action in Application 201210552358.6, dated Mar. 10, 2016, 10 pages.
U.S. Appl. No. 13/330,131, Notice of Allowance dated Oct. 31, 2016, 3 pgs.
Chinese 4th Office Action in Application 201210552294.X, dated Aug. 15, 2016, 12 pgs.
Russian Office Action in Application 2014124929, dated Sep. 1, 2016, 6 pgs.
U.S. Appl. No. 15/221,086, Notice of Allowance dated Apr. 21, 2017, 15 pgs.
U.S. Appl. No. 15/221,086, Notice of Allowance dated Jun. 6, 2017, 4 pgs.
Riggs, Jim, "True Preview", Aug. 21, 2009, 1 page.
U.S. Appl. No. 13/330,114, Amendment and Response filed Apr. 9, 2015, 13 pgs.
U.S. Appl. No. 13/330,114, Office Action dated Jan. 23, 2015, 31 pgs.
U.S. Appl. No. 13/330,131, Amendment and Response filed Jan. 8, 2015, 13 pgs.
U.S. Appl. No. 13/330,131, Office Action dated Feb. 4, 2015, 26 pgs.
U.S. Appl. No. 13/330.131, Amendment and Response filed May 4, 2015, 13 pgs.
Chinese Notice of Allowance in Application 201210552294.X, dated Jun. 13, 2017, 4 pgs.
U.S. Appl. No. 13/330,114, Amendment and Response filed Jul. 13, 2017, 11 pgs.

(56) References Cited

OTHER PUBLICATIONS

U.S. Appl. No. 13/330,114, Office Action dated Aug. 8, 2017, 15 pgs.
U.S. Appl. No. 15/221,086, Notice of Allowance dated Jun. 22, 2017, 4 pgs.
Australian Exam Report in Application 2012355676, dated Sep. 11, 2017, 4 pgs.
European Summons and OA in Application 12858774.8, dated Oct. 6, 2017, 7 pages.
U.S. Appl. No. 13/330,114, Amendment and Response filed Oct. 11, 2017, 13 pgs.
U.S. Appl. No. 13/330,114, Advisory Action dated Oct. 25, 2017, 4 pgs.

* cited by examiner

PERFORMING OPERATIONS ON DELETED ITEMS USING DELETED PROPERTY INFORMATION

BACKGROUND

Users commonly view electronic messages and perform other operations on electronic messages (e.g. forwarding, replying, marking urgent, moving, deleting . . . ). When a user deletes an electronic message, the electronic message may be moved to a deleted items folder. While the user may view electronic messages that were deleted in the deleted items folder, it may be difficult to locate a specific deleted item.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Deleted property information relating to deleting an item, such as an electronic message, is stored for later use. The stored deleted property information may relate to one or more different properties that are associated with the deletion of the item, such as: a time when the item was deleted, a device from which item was deleted, a device on which the item was stored when deleted, a location of a user where the item was deleted, an application associated with the item, and the like. The deleted property information may be used to perform various operations. For example, deleted items may be sorted using the deleted item property information (e.g. time of deletion, device, location, application), rules may be created to use the deleted property information, deleted items may be restored based on the deleted property information, and the like.

DETAILED DESCRIPTION

Figure 1:
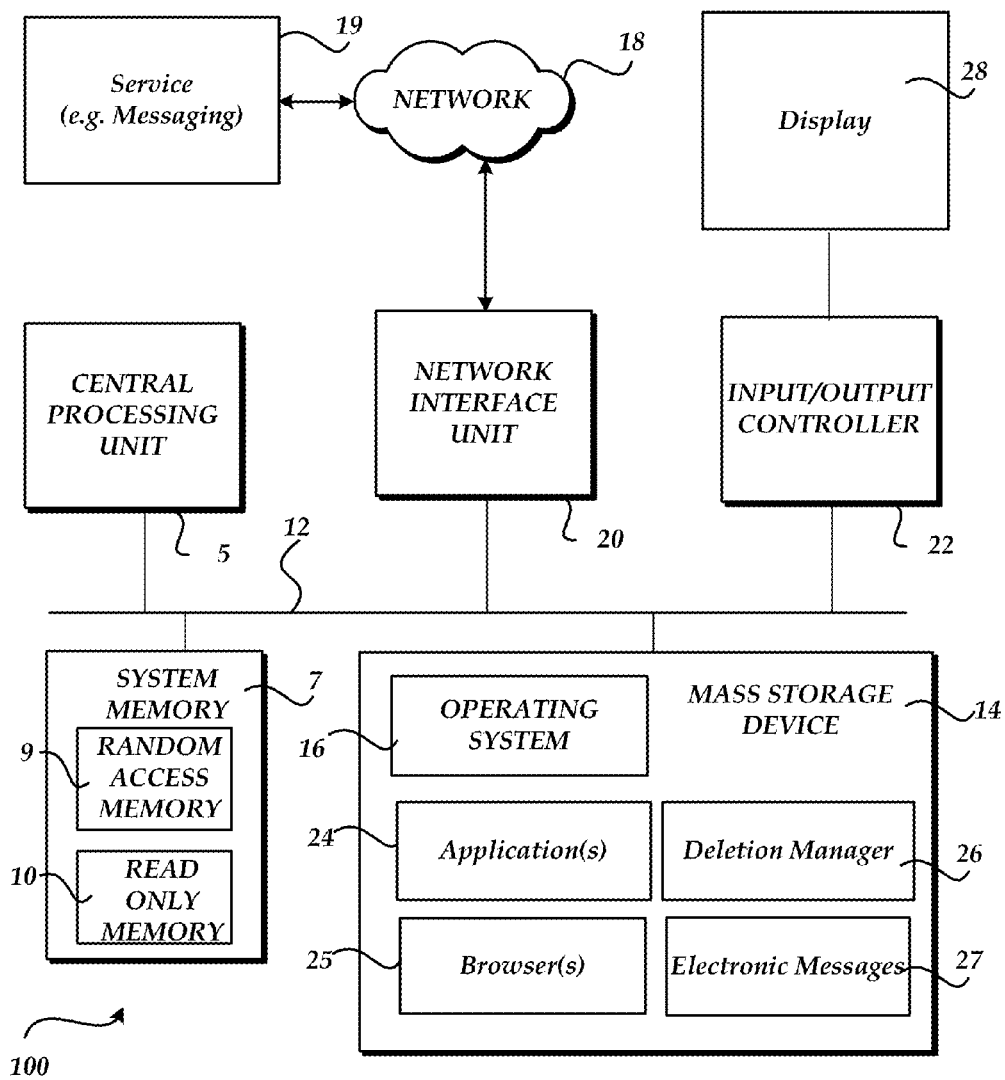
FIG. 1 illustrates an exemplary computing device.

Referring now to the drawings, in which like numerals represent like elements, various embodiments will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer architecture for a computer 100 utilized in the various embodiments will be described. The computer architecture shown in FIG. 1 may be configured as a server computing device, a desktop computing device, a mobile computing device (e.g. smartphone, notebook, tablet . . . ) and includes a central processing unit 5 ("CPU"), a system memory 7, including a random access memory 9 ("RAM") and a read-only memory ("ROM") 10, and a system bus 12 that couples the memory to the central processing unit ("CPU") 5.

A basic input/output system containing the basic routines that help to transfer information between elements within the computer, such as during startup, is stored in the ROM 10. The computer 100 further includes a mass storage device 14 for storing an operating system 16, application(s) 24, electronic messages 27, and other program modules, such as Web browser 25, and deletion manager 26, which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

According to various embodiments, computer 100 may operate in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, such as a touch input device. The touch input device may utilize any technology that allows single/multi-touch input to be recognized (touching/non-touching). For example, the technologies may include, but are not limited to: heat, finger pressure, high capture rate cameras, infrared light, optic capture, tuned electromagnetic induction, ultrasonic receivers, transducer microphones, laser rangefinders, shadow capture, and the like. According to an embodiment, the touch input device may be configured to detect near-touches (i.e. within some distance of the touch input device but not physically touching the touch input device). The touch input device may also act as a display 28. The input/output controller 22 may also provide output to one or more display screens, a printer, or other type of output device.

A camera and/or some other sensing device may be operative to record one or more users and capture motions and/or gestures made by users of a computing device. Sensing device may be further operative to capture spoken words, such as by a microphone and/or capture other inputs from a user such as by a keyboard and/or mouse (not pictured). The sensing device may comprise any motion detection device capable of detecting the movement of a user. For example, a camera may comprise a MICROSOFT KINECT® motion capture device comprising a plurality of cameras and a plurality of microphones.

Embodiments of the invention may be practiced via a system-on-a-chip (SOC) where each or many of the components/processes illustrated in the FIGURES may be integrated onto a single integrated circuit. Such a SOC device may include one or more processing units, graphics units, communications units, system virtualization units and various application functionality all of which are integrated (or "burned") onto the chip substrate as a single integrated circuit. When operating via a SOC, all/some of the functionality, described herein, may be integrated with other components of the computer 100 on the single integrated circuit (chip).

As mentioned briefly above, a number of program modules and data files may be stored in the mass storage device 14 and RAM 9 of the computer 100, including an operating system 16 suitable for controlling the operation of a networked computer, such as the WINDOWS 7®, WINDOWS SERVER® operating systems from MICROSOFT CORPORATION of Redmond, Wash.

The mass storage device 14 and RAM 9 may also store one or more program modules. In particular, the mass storage device 14 and the RAM 9 may store one or more applications, such as deletion manager 26, messaging application(s) 24 (e.g. a messaging application such as MICROSOFT OUTLOOK, an Instant Messaging (IM) application, an SMS message, and the like), and may store one or more Web browsers 25. The Web browser 25 is operative to request, receive, render, and provide interactivity with electronic content, such as Web pages, electronic messages, videos, documents, and the like. According to an embodiment, the Web browser comprises the INTERNET EXPLORER Web browser application program from MICROSOFT CORPORATION.

Deletion manager 26 may be located on a client device and/or on a server device (e.g. within service 19). Deletion manager 26 may be configured as an application/process and/or as part of a cloud based multi-tenant service that provides resources (e.g. services, data . . . ) to different tenants (e.g. MICROSOFT OFFICE 365).

Generally, deletion manager 26 is configured to perform operations relating to storing deleted property information and performing actions using the deleted property information. Deleted property information relating to deleting an item, such as an electronic message, is obtained by deletion manager 26 and stored for later use. The stored deleted property information may relate to one or more different properties that are associated with the deletion of the item, such as: a time when the item was deleted, a device from which item was deleted, a device on which the item was stored when deleted, a location of a user where the item was deleted, an application associated with the item, and the like. The deleted property information may be used to perform various operations. For example, deleted items may be sorted using the deleted item property information (e.g. time of deletion, device, location, application), rules may be created to use the deleted property information, deleted items may be restored based on the deleted property information, and the like. Additional details regarding the operation of deletion manager 26 will be provided below.

Figure 2:
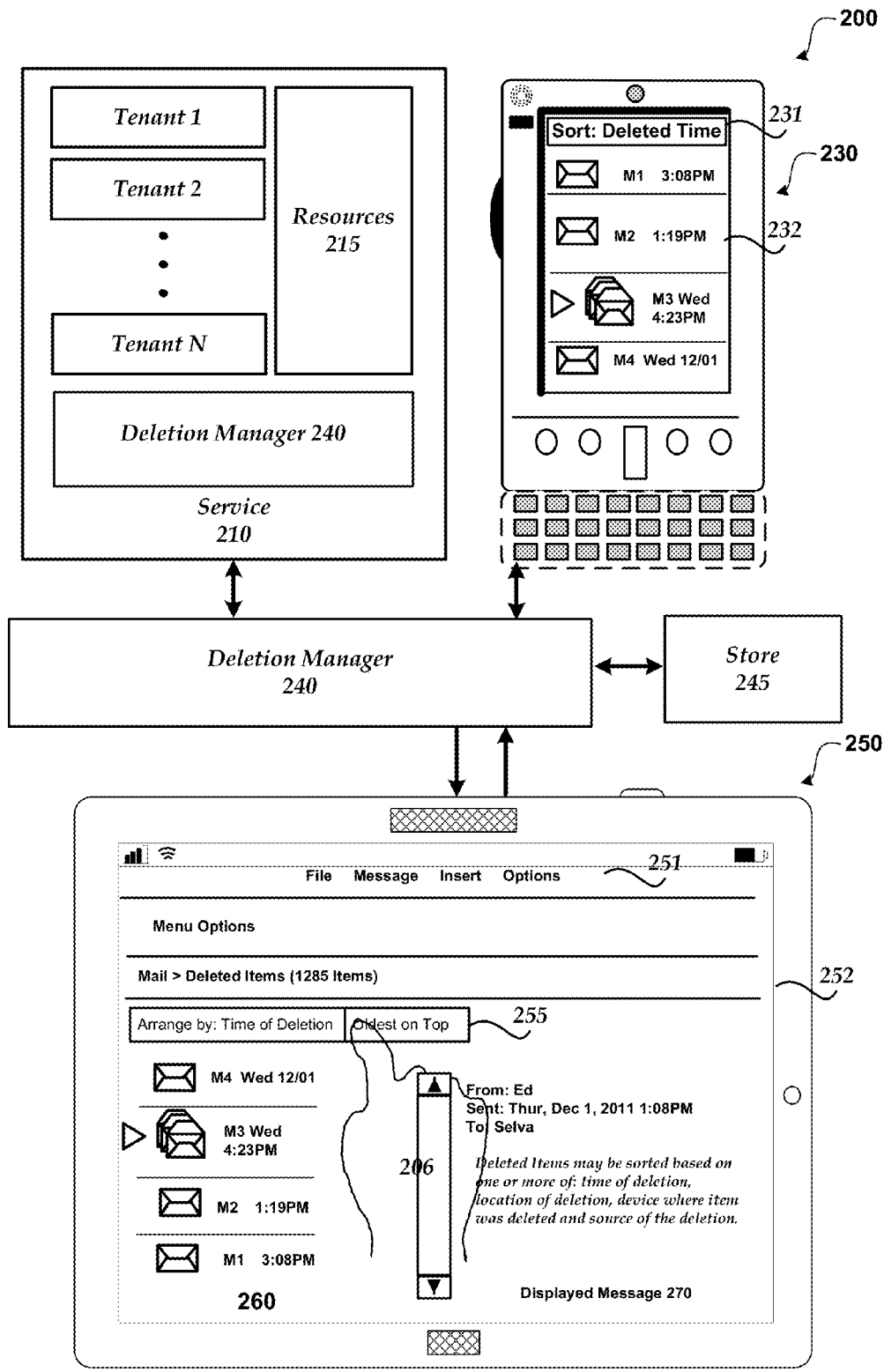
FIG. 2 illustrates an exemplary system for storing deleted property information and performing operations on electronic messages using the deleted property information.

FIG. 2 illustrates an exemplary system for storing deleted property information and performing operations on electronic messages using the deleted property information. As illustrated, system 200 includes service 210, deletion manager 240, store 245, touch screen input device/display 250 (e.g. slate) and mobile device 230, such as a smartphone.

As illustrated, service 210 is a cloud based and/or enterprise based service that may be configured to provide electronic messaging services (e.g. MICROSOFT OFFICE 365 or some other cloud based/online service that provides messaging services). Functionality of one or more of the services/applications provided by service 210 may also be configured as a client based application. For example, a client device may include an application that performs operations relating to sending/receiving/interacting with electronic messages and deleted items, such as email messages. The messaging application/service may also provide messaging services relating to other types of messages (e.g. IM messages, SMS, MMS, and the like) Although system 200 shows a messaging service, other services/applications may be configured to use deleted property information to interact with deleted items.

As illustrated, service 210 is a multi-tenant service that provides resources 215 and services to any number of tenants (e.g. Tenants 1-N). According to an embodiment, multi-tenant service 210 is a cloud based service that provides resources/services 215 to tenants subscribed to the service and maintains each tenant's data separately and protected from other tenant data.

System 200 comprises a touch screen input device/display 250 (e.g. a slate/tablet device) and mobile device 230 that detects when a touch input has been received (e.g. a finger touching or nearly touching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

As illustrated, touch screen input device/display 250 and mobile device 230 show an exemplary display 252/232 of deleted electronic messages. Electronic messages (deleted and non-deleted) may be stored on a device (e.g. mobile device 230, slate 250 and/or at some other location (e.g. network store 245). Mobile device 230 shows display 232 illustrating deleted email messages shown in a list view that are ordered based on a time each email was deleted (231). Mobile device 230 shows the deleted messages arranged from most recently deleted to oldest deleted. The electronic messages may be displayed by an email program, a text messaging program, an Instant Messaging program, a messaging service, and the like. The messages may be displayed in a list, arranged as threads, and/or arranged in different manners. The messages may be displayed by a client based application and/or by a server based application (e.g. enterprise, cloud based).

Slate 250 shows a user 206 selecting to sort messages from oldest deleted to most recently deleted (255).

Deletion manager 240 is configured to perform operations relating to storing deleted property information and using the stored deleted property information to interact with deleted messages and/or other content. The deleted property information may be used with different types of operations. For example, the operations may be to: sort deleted items using the deleted property information; restore deleted items using the deleted property information; filter the deleted items using the deleted property information, triggering one or more rules using the deleted property information; and the like. All/portion of the deleted property information that is associated with each of the deleted message may be accessed depending on the requested operation. For example, the time of deletion for each deleted item may be used to sort the deleted items.

Deletion manager 240 is also configured to determine when an item is deleted and what information to store in response to the deletion of an item. For example, one or more of the following may be determined and stored: a time of deletion; a device used to delete the item; a device where the deleted item was stored; and a location where a user was when the item was deleted. Other deletion information may also be stored (e.g. application associated with the deleted item, application last used to access the deleted item, . . . ). More details are provided herein.

Figure 3:
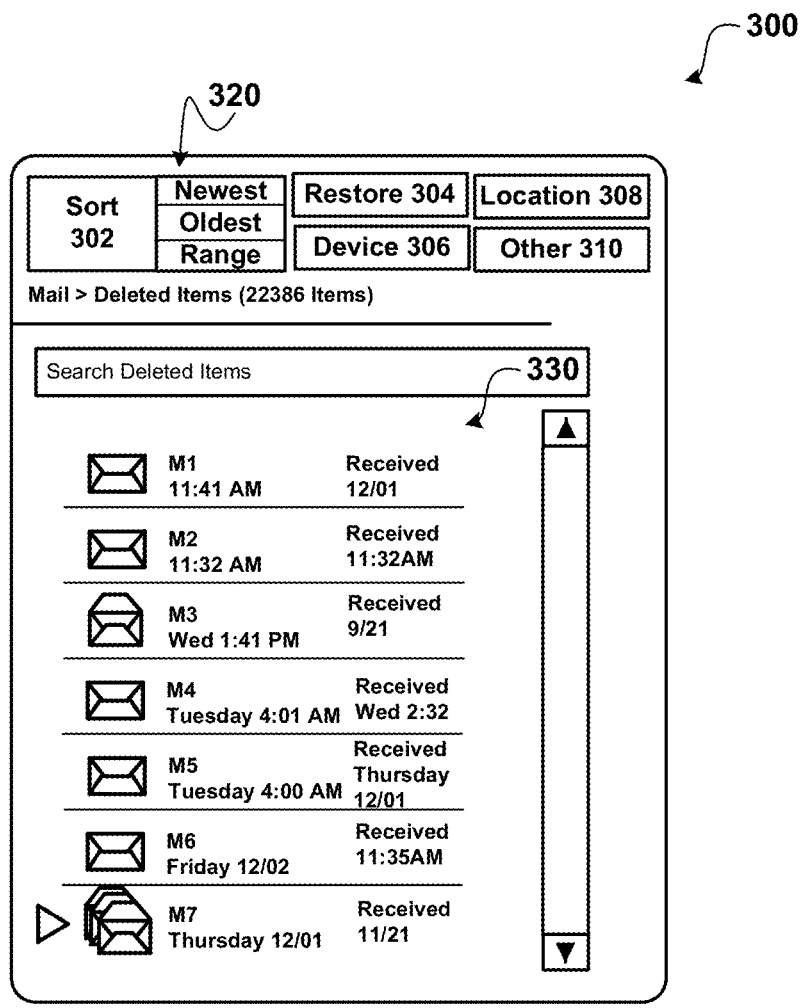
FIG. 3 shows a display illustrating a messaging window that shows a user interacting with electronic messages that were deleted.

FIG. 3 shows a display illustrating a messaging window that shows a user interacting with electronic messages that were deleted. As illustrated, window 300 includes a message list 330. More or fewer areas may be included within window 300. For example, window 300 may include a folder list and a preview area. A folder list may be used to show different folders that may be selected to populate message list 330 (e.g. selecting a deleted items folder to show deleted items). A preview area (See FIG. 2) may be used to show message content that is associated with a selected message/message thread. A graphical indicator, such as an icon and/or coloring/highlighting, may be displayed to indicate a selected message.

Window 300 may be a window that is associated with a desktop application, a mobile application and/or a web-based application (e.g. displayed by a browser). For example, a web browser may access an electronic mail service, an email application on a computing device may be configured to compose/send/receive emails from one or more different services, and the like.

Message list 330 shows a list of the deleted items. The messages illustrated within message list may be sorted/filtered in different manners. A user may use User Interface (UI) options 320 to specify the values used for determining the deleted messages to show within message list 320 and/or their ordering. For example, the messages may be sorted 302 based on: the most recently deleted (newest) to oldest deleted by date; the oldest deleted to the newest deleted; and a range of dates may be specified. The messages may also be filtered based on a device 306 from which the item was deleted, a device 306 from which the item was stored, and a location 308 where the user was located when the item was deleted. Deleted items may also be restored using restore option 304. A user may specify that they would like items restored that were deleted within a predetermined time period (e.g. last 2 hours), deleted from a particular device, deleted from a particular location, deleted while the user was at a particular location and/or any combination using the deleted property information.

As illustrated, the deleted messages in message list 330 are displayed in order of the most recently deleted. Message list 330 shows single messages and message threads. The messages in message thread may be expanded by selecting the expand/collapse icon before the message thread. In the current example, the time of deletion for each message is displayed beneath the message identifier and a time the message was received is displayed underneath the Received heading. For example, message M1 was deleted at 11:41 AM and received on 12/01, message M2 was deleted at 11:32 and received at 11:32 AM, message M3 was deleted Wednesday at 1:41 PM and received on September 21, and so on. As can be seen, even though a message may have been received earlier than a previous message, the ordering of the deleted messages within message list 330 is based on the time of deletion (most recently deleted to oldest deleted) and is not sorted based on the received time of the message. As such, a user may be able to more easily locate the recently deleted items. The user may also sort the deleted messages on other properties, such as the received time.

Figure 4:
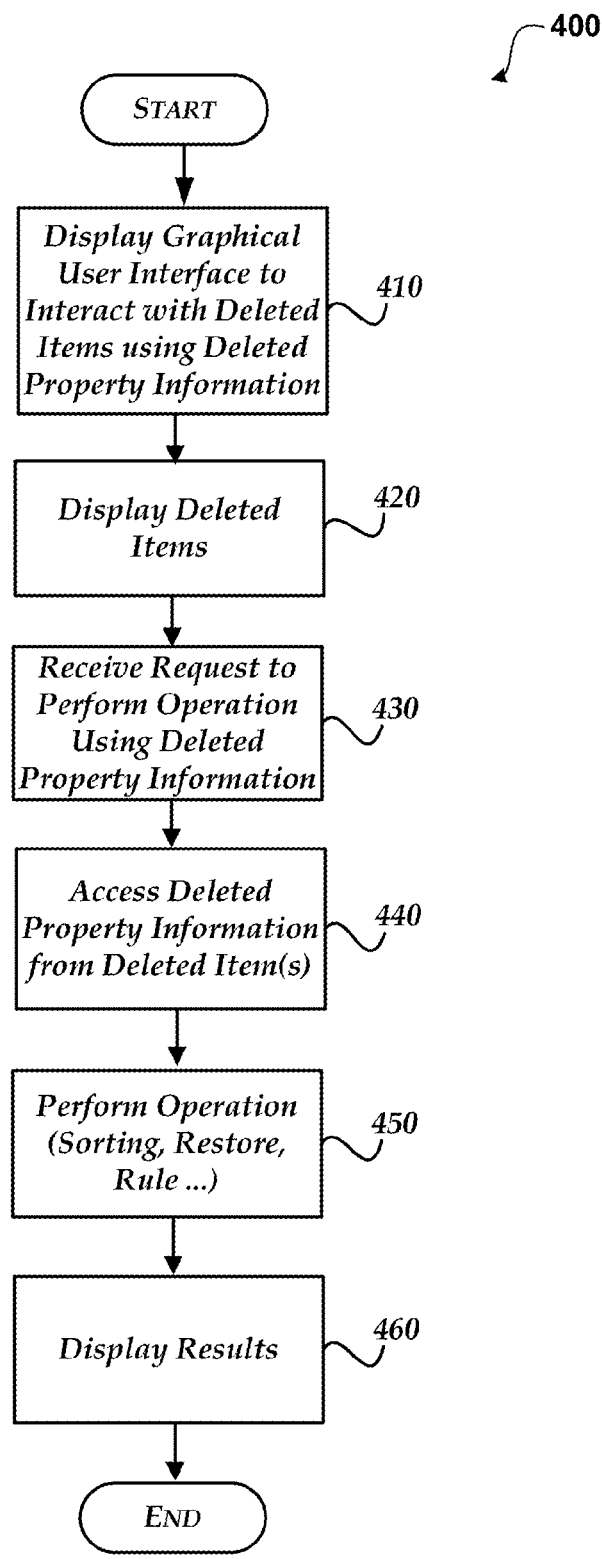
FIG. 4 shows a process for interacting with deleted items using deleted property information.
Figure 5:
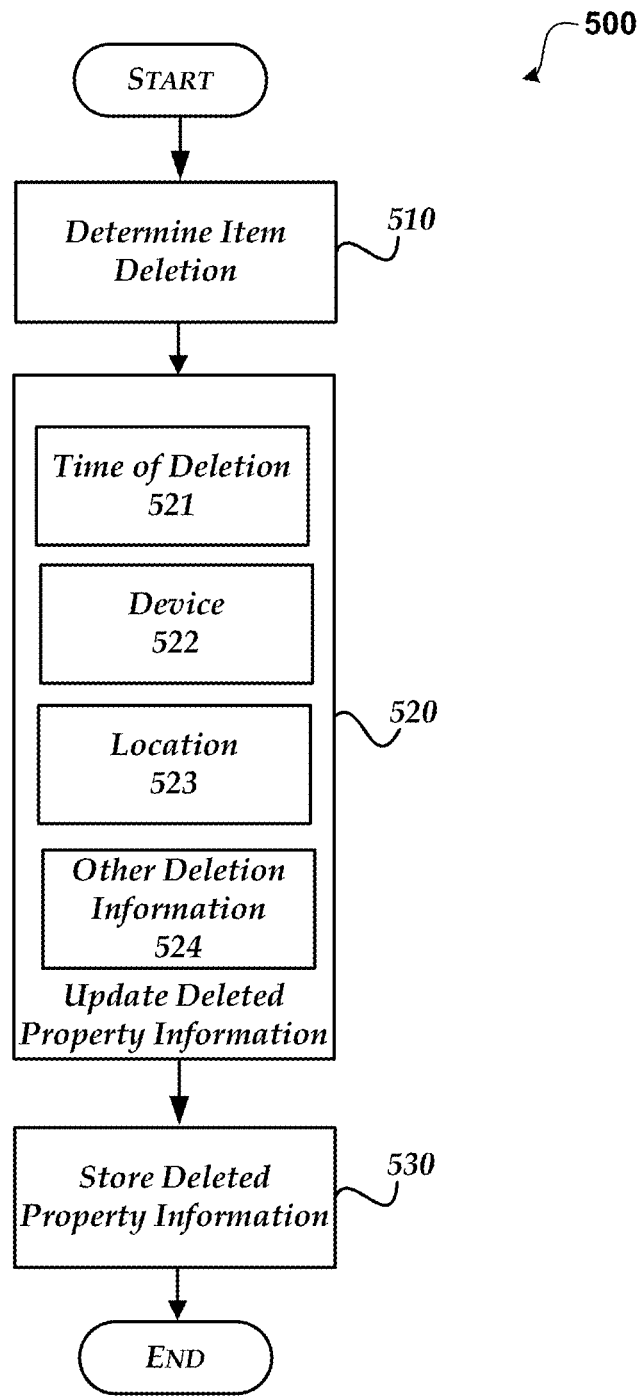
FIG. 5 shows a process for storing deleted property information when an item is deleted.

FIGS. 4-5 show illustrative processes for storing and interacting with deleted electronic messages. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof. While the operations are shown in a particular order, the ordering of the operations may change and be performed in other orderings.

FIG. 4 shows a process 400 for interacting with deleted items using deleted property information.

After a start operation, the process flows to operation 410, where a graphical user interface is displayed to interact with deleted items. According to an embodiment, the items are electronic messages. For example, the electronic messages may be one or more of: email messages, SMS, MMS, and the like). The graphical user interface includes different user interface elements for interacting with the deleted items. For example, user interface elements may be used to sort electronic messages (e.g. oldest to newest, newest to oldest, within a range, deleted on a particular device(s), deleted at a particular location, . . . ), restore deleted items, create/fire rules using the deleted property information, filter deleted items and the like.

Moving to operation 420, the deleted items are displayed. The messages may be displayed in a list, arranged as threads, and/or arranged in different manners. The messages may be displayed by a client based application and/or by a server based application (e.g. enterprise, cloud based). According to an embodiment, the deleted items are initially displayed in the GUI from the newest deleted items (e.g. most recently deleted) to the oldest deleted items.

Flowing to operation 430, a request is received to perform an operation using the deleted property information. The requested operation may be received through the GUI and/or through some other method. For example, the request may be automatically generated to run one or more rule that use one or more values obtained from the deleted property information. The operation may be many different types of operations. For example, the operation may be to: sort deleted items using the deleted property information; restore deleted items using the deleted property information; filter the deleted items using the deleted property information, triggering one or more rules using the deleted property information; and the like.

Transitioning to operation 440, the deleted items are accessed to determine the associated deleted property information. All/portion of the deleted property information may be accessed depending on the requested operation. For example, the time of deletion for each deleted item may be used to sort the deleted items according to the time of deletion without accessing any other deleted property information that is stored for the item.

Moving to decision operation 450, the operation is performed.

Transitioning to operation 460, the results of performing the operation are displayed. For example, an ordering of the deleted items may be updated, some deleted items may be filtered, one or more items may be restored, and the like.

The process then moves to an end operation and returns to processing other actions.

FIG. 5 shows a process for storing deleted property information when an item is deleted.

After a start operation, the process flows to operation 510, where a determination is made that an item is deleted. The item may be deleted manually (e.g. upon a user selection) and/or automatically (e.g. a rule fires that deletes certain items).

Moving to operation 520, deleted property information for the deleted item is updated. Different deleted property information may be associated with the deleted item such that it may be used at a later time. For example, one or more of the following may be determined: a time of deletion 521; a device used to delete the item 522; a device where the deleted item was stored 522; and a location where a user was when the item was deleted 523. Other deletion information 524 may also be stored (e.g. application associated with the deleted item, application last used to access the deleted item, . . . ).

Flowing to operation 530, the deleted property information is stored. According to an embodiment, the deleted property information is stored as one or more properties that is stored in the metadata for the deleted item. According to an embodiment, the deleted properties and corresponding values may be viewed by a user through a user interface and/or accessed programmatically.

The process then moves to an end operation and returns to processing other actions.

Figure 6:
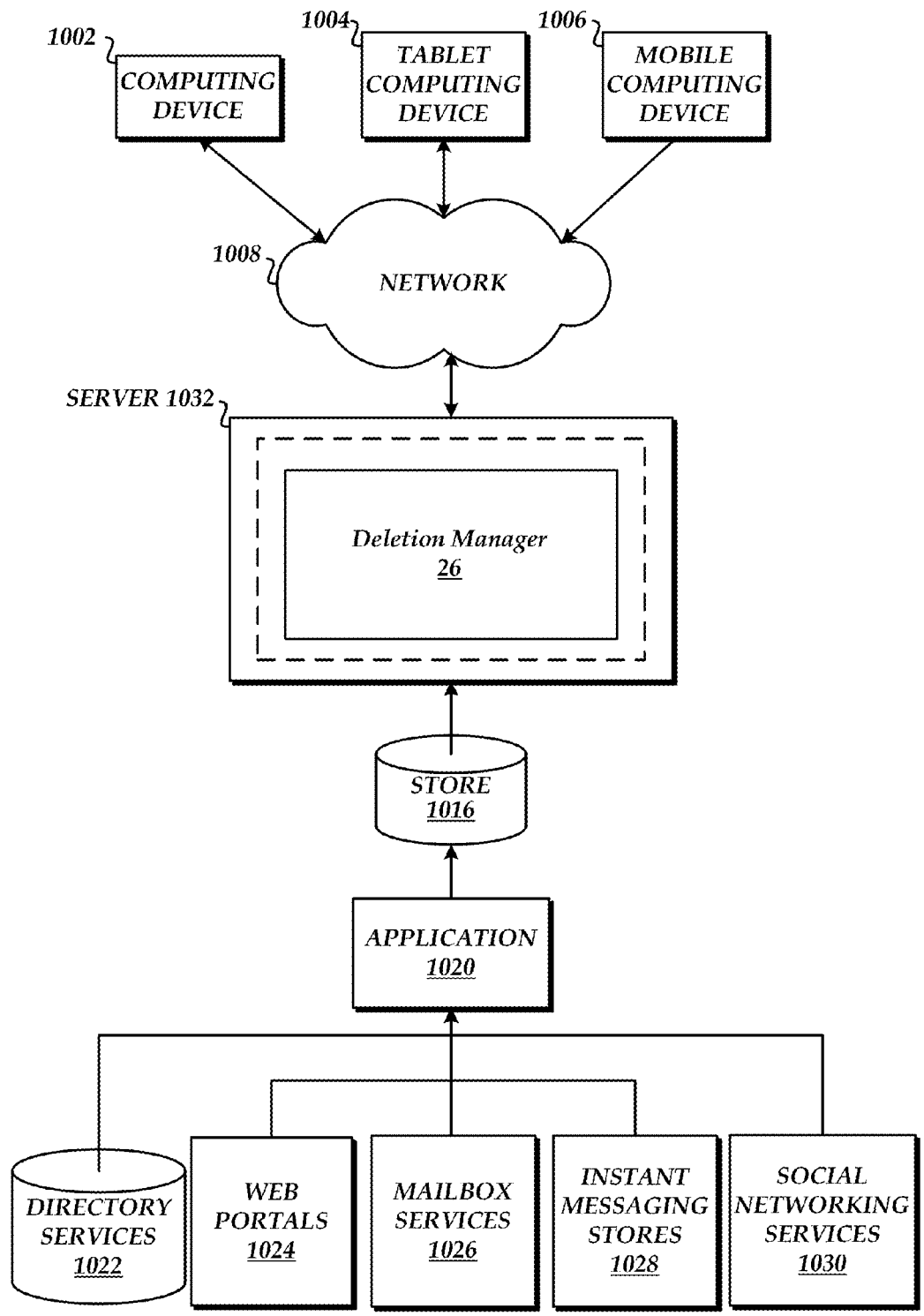
FIG. 6 illustrates a system architecture used in interacting with electronic message.

FIG. 6 illustrates a system architecture used in interacting with electronic messages, as described herein. Content used and displayed by the application (e.g. application 1020) and the deletion manager 26 may be stored at different locations. For example, application 1020 may use/store data using directory services 1022, web portals 1024, mailbox services 1026, instant messaging stores 1028 and social networking sites 1030. The application 1020 may use any of these types of systems or the like. A server 1032 may be used to access sources and to prepare and display electronic messages. For example, server 1032 may access electronic messages including deleted electronic messages for application 1020 to display at a client (e.g. a browser or some other window). As one example, server 1032 may be a web server configured to provide messaging services (e.g. email, text messages, IM messages, and the like) to one or more users. Server 1032 may use the web to interact with clients through a network 1008. Server 1032 may also comprise an application program (e.g. a messaging application). Examples of clients that may interact with server 1032 and a presentation application include computing device 1002, which may include any general purpose personal computer, a tablet computing device 1004 and/or mobile computing device 1006 which may include smart phones. Any of these devices may obtain content from the store 1016.

Figure 7:
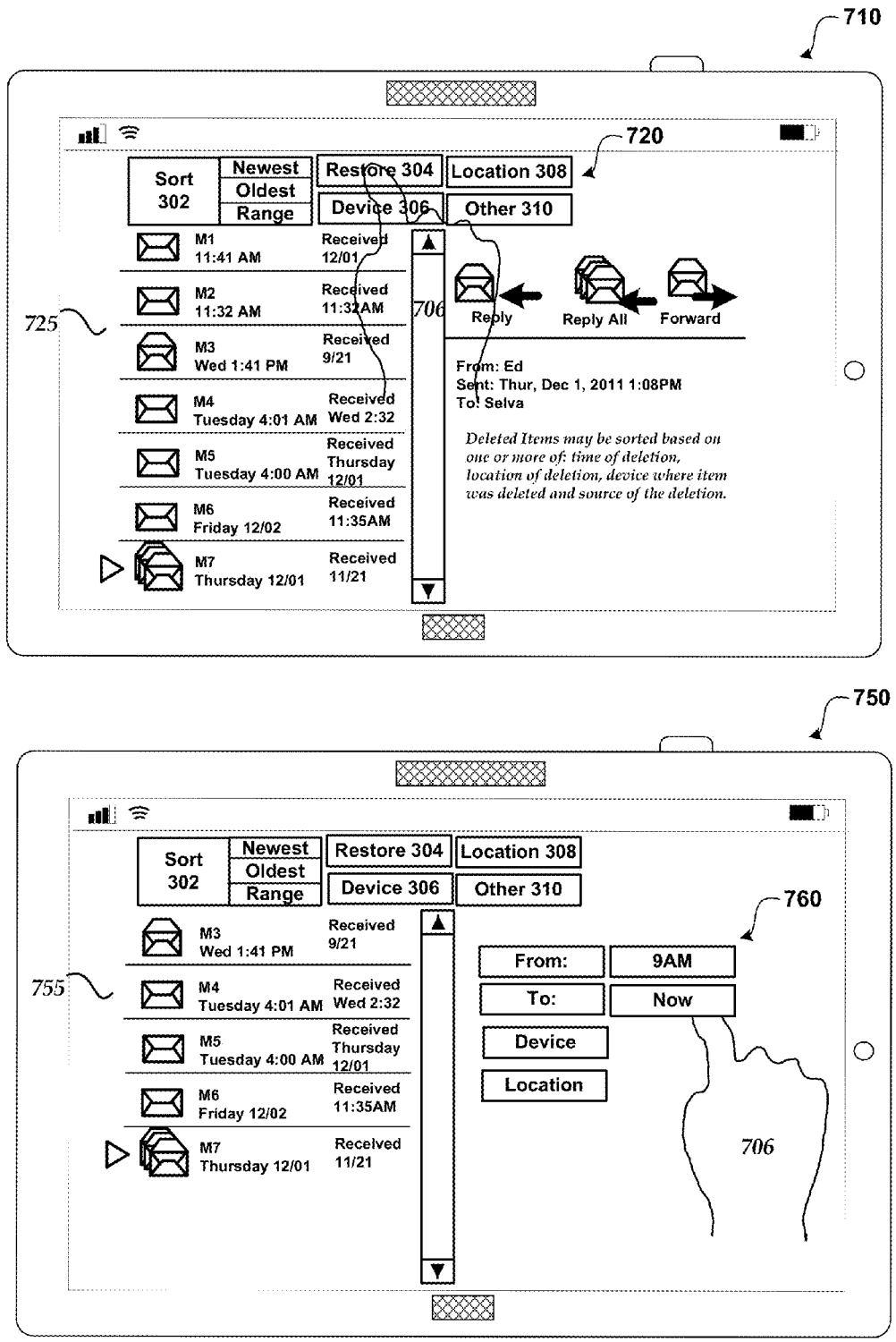
FIGS. 7-9 show exemplary displays illustrating performing operations using the deleted property information.
Figure 8:
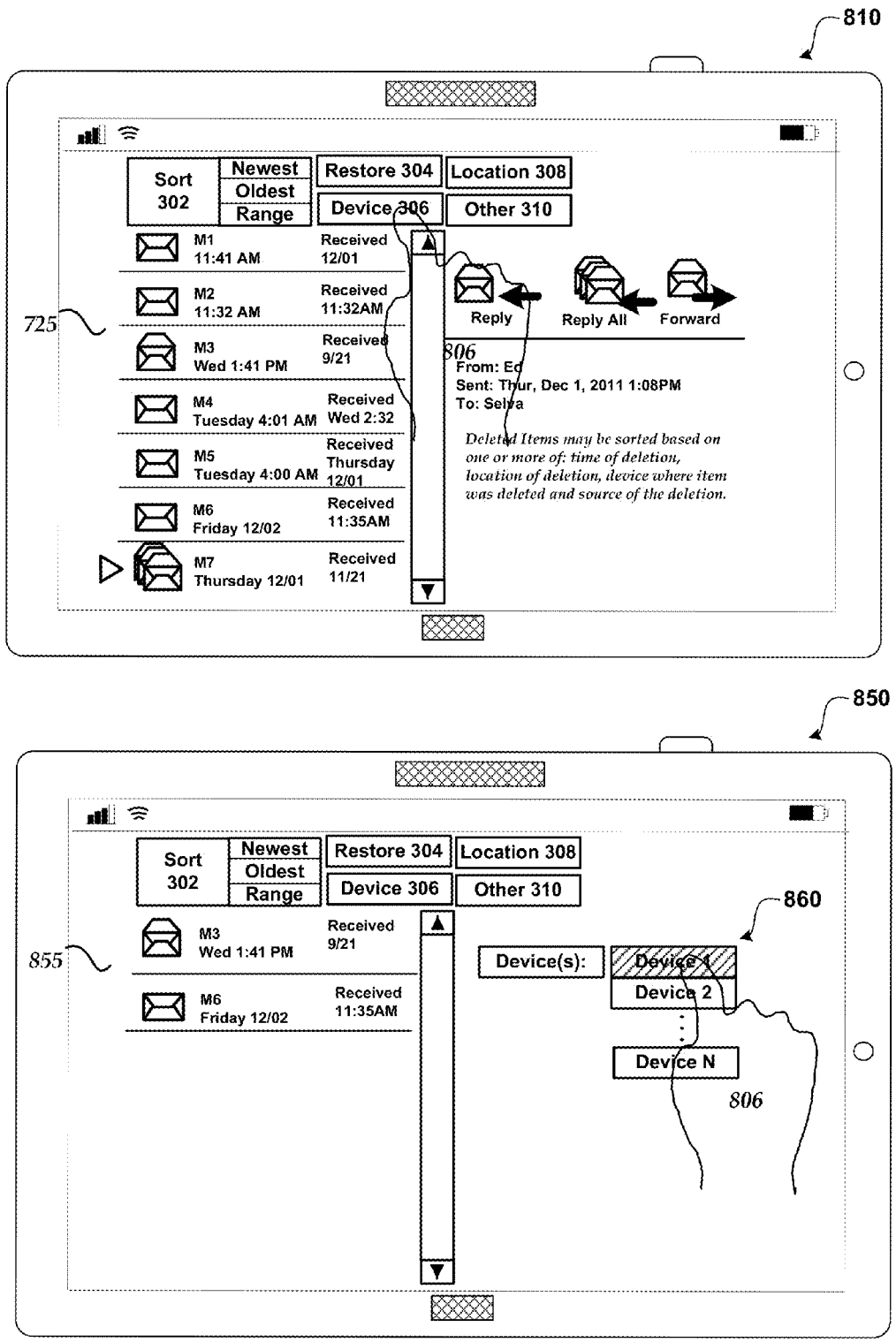
Figure 9:
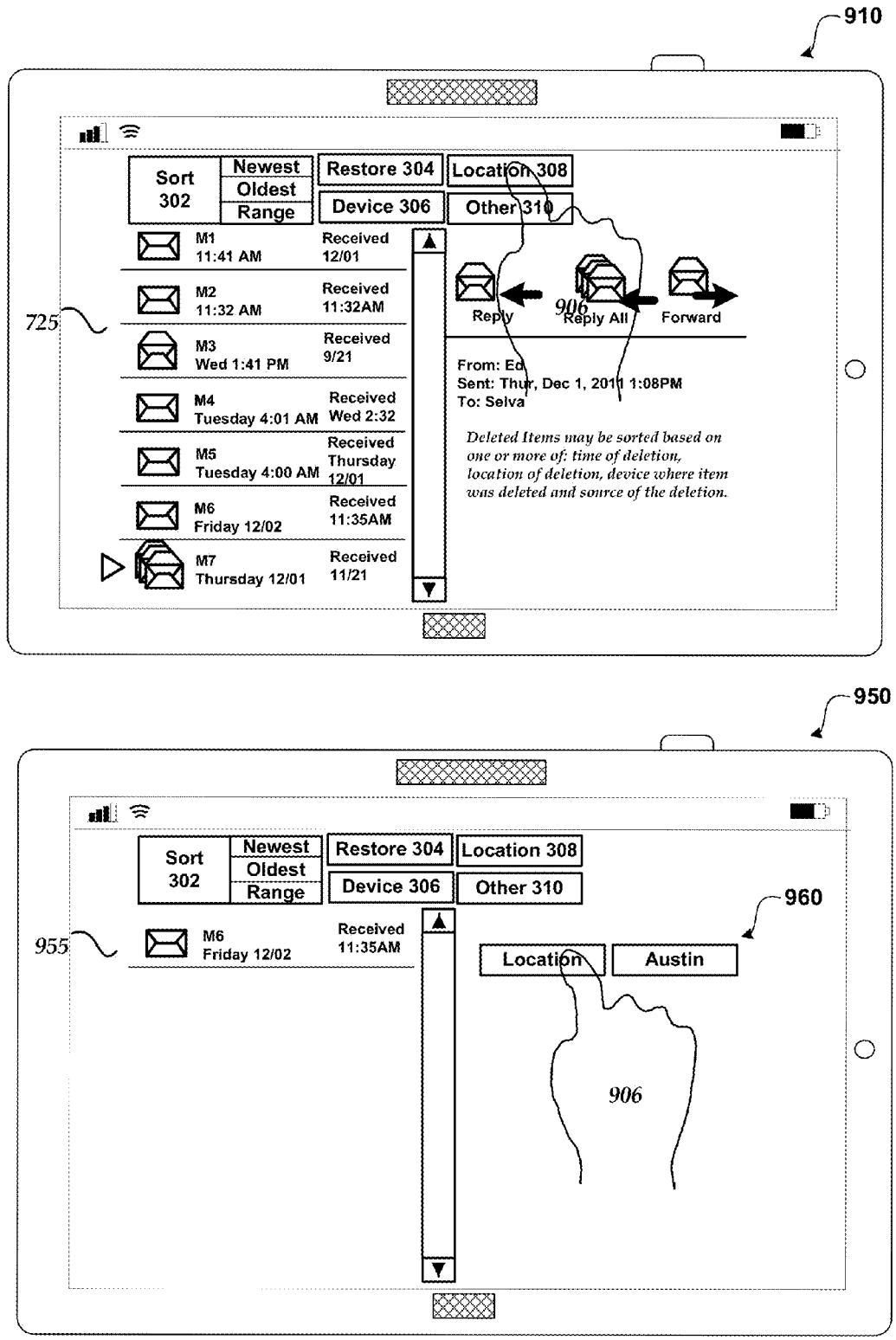

FIGS. 7-9 show exemplary displays illustrating performing operations using the deleted property information. The examples shown herein are for illustration purposes and not intended to be limiting.

FIG. 7 shows an exemplary landscape slate display showing interaction with deleted electronic messages.

Display 710 shows a display showing a list 725 of deleted electronic messages that are initially displayed in the order from most recently deleted to oldest deleted. As described herein, the deleted electronic messages may be displayed using other sorting/filtering values. As illustrated, user 706 is selecting Restore operation 304 to restore deleted items that meet one or more specified conditions.

Display 750 shows user 706 entering values 760 that are used for determining the deleted electronic messages to restore. As illustrated, user 706 has entered to restore the items that were deleted between 9 AM today and the current time. Other times may be entered (e.g. items within the last X minutes/days) as well as other filtering information may be entered to determine what items to restore (e.g. restore items deleted on device 1 from yesterday, restore items deleted within the last week that were deleted in Seattle). After the user has entered the desired parameter, the items are restored. A preview may be displayed to show the determined items to restore before restoring the items. For example, the identified items may be displayed differently within the same window and/or displayed in a different window (not illustrated). After restoring the determined items (in this example, items M1 and M2), list 755 shows the remaining deleted items.

FIG. 8 shows an exemplary landscape slate display showing interaction with deleted electronic messages.

Display 810 shows a display showing a list 725 of deleted electronic messages that are initially displayed in the order from most recently deleted to oldest deleted. As illustrated, user 806 is selecting Device operation 306 to sort the deleted items that were deleted on one or more devices.

Display 850 shows user 806 selecting devices 860 that are used for determining the deleted electronic messages to display. As illustrated, user 806 has selected to display items deleted on device 1. Other device(s) may also be selected. After the user has selected the desired devices, the deleted items from the selected devices are displayed. In this example, list 855 shows the deleted items from selected device 1.

FIG. 9 shows an exemplary landscape slate display showing interaction with deleted electronic messages.

Display 910 shows a display showing a list 725 of deleted electronic messages that are initially displayed in the order from most recently deleted to oldest deleted. As illustrated, user 906 is selecting Location operation 308 to sort the deleted items that were deleted at a particular location or within a range of a location.

Display 950 shows user 906 selecting one or more locations 960 that are used for determining the deleted electronic messages to display. As illustrated, user 906 has selected to display items deleted while the user was in Austin. Other location(s) may also be selected. After the user has selected the desired locations, the deleted items from the selected locations are displayed. In this example, list 955 shows the deleted items from Austin.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for performing operations using deleted property information, comprising:
   receiving a request to perform an operation involving one or more deleted items that are electronic messages, wherein the one or more deleted items are displayed in a deleted items folder using a graphical user interface;
   accessing deleted property information for the one or more deleted items that includes a time of deletion for the one or more deleted items and at least one of: a device where the one or more deleted items were stored, and an application last used to access the one or more deleted items;
   displaying the deleted property information for the one or more deleted items in the deleted items folder;
   receiving a selected value from the deleted items folder using the graphical user interface, the selected value associated with the deleted property information; and
   in response to receiving the selected value, determining whether the one or more deleted items are associated with the selected value; and
   performing the operation on the one or more deleted items determined to be associated with the selected value.

2. The method of claim 1, wherein the operation comprises sorting deleted items based on the selected value.

3. The method of claim 1, wherein the operation comprises restoring deleted items that are identified by the selected value.

4. The method of claim 1, wherein the operation comprises executing a client defined rule that uses the deleted property information.

5. The method of claim 1, wherein the deleted property information further comprises a device where the one or more items were deleted and wherein the operation comprises identifying deleted items that match one or more specified devices and one or more specified times of deletion.

6. The method of claim 1, wherein the deleted property information is a property of the one or more items and is updated with the time of deletion when the one or more items are deleted.

7. The method of claim 1, further comprising displaying a list of deleted items that are sorted based on the time of deletion and arranged according to at least one of: newest deleted to oldest deleted; oldest deleted to newest deleted; and deleted within a range of deletion times.

8. The method of claim 1, further comprising displaying the graphical user interface that includes a list of deleted items and includes user interface element for sorting the deleted items using the deleted property information and a user interface element for restoring deleted items using the deleted property information.

9. A computer storage device having computer-executable instructions, that when executed by a processor, perform a method for interacting with deleted electronic messages, the method comprising:
   receiving a request to perform an operation involving one or more deleted electronic messages, wherein the one or more deleted electronic messages are displayed in a deleted items folder using a graphical user interface;
   accessing deleted property information for the one or more deleted electronic messages that are updated with a time of the deletion when a corresponding electronic message is deleted and at least one of: a device where the one or more deleted electronic messages were stored, and an application last used to access the one or more deleted electronic messages;
   displaying the deleted property information for the one or more deleted electronic messages in the deleted items folder;
   receiving a selected value from the deleted items folder using the graphical user interface, the selected value associated with the deleted property information; and
   in response to receiving the selected value, determining whether the one or more deleted electronic messages are associated with the selected value; and
   performing the operation on the one or more deleted electronic messages determined to be associated with the selected value.

10. The computer storage device of claim 9, wherein the operation comprises at least one of:
   sorting deleted electronic messages based on the selected value; restoring deleted electronic messages that are identified by the selected value; and
   executing a client defined rule that uses the deleted property information.

11. The computer storage device of claim 9, further comprising displaying a list of deleted electronic messages that are sorted based on the time of deletion and arranged according to at least one of: newest deleted to oldest deleted; oldest deleted to newest deleted; and deleted within a range of deletion times.

12. The computer storage device of claim 9, further comprising displaying the graphical user interface that includes a list of deleted electronic messages and includes user interface element for sorting the deleted electronic messages using the deleted property information and a user interface element for restoring deleted electronic messages using the deleted property information.

13. The computer storage device of claim 9, further comprising receiving a definition of a rule using one or more values from the deleted property information.

14. A system for interacting with electronic messages, comprising:
a display;
a network connection that is coupled to a network;
a processor and a computer-readable medium;
an operating environment stored on the computer-readable medium and executing on the processor; and
a process operating under the control of the operating environment and operative to perform actions, comprising:
receiving a request to perform an operation involving one or more deleted electronic messages, wherein the one or more deleted electronic messages are displayed in a deleted items folder using a graphical user interface;
accessing deleted property information for the one or more deleted electronic messages that are updated with a time of the deletion when a corresponding electronic message is deleted and at least one of: a device where the one or more deleted electronic messages were stored, and an application last used to access the one or more deleted electronic messages;
displaying the deleted property information for the one or more deleted electronic messages in the deleted items folder;
receiving a selected value from the deleted items folder using the graphical user interface, the selected value associated with the deleted property information; and
in response to receiving the selected value, determining whether the one or more deleted electronic messages are associated with the selected value; and
performing the operation on the one or more deleted electronic messages determined to be associated with the selected value, the operation comprising sorting the one or more deleted electronic messages in the deleted items folder by the device where the one or more deleted electronic messages were stored.

15. The system of claim 14, wherein the operation comprises at least one of:
sorting deleted electronic messages based on the selected value;
restoring deleted electronic messages that are identified by the selected value; and
executing a client defined rule that uses the deleted property information.

16. The system of claim 14, further comprising displaying a list of deleted electronic messages that are sorted based on the time of deletion and arranged according to at least one of: newest deleted to oldest deleted; oldest deleted to newest deleted; and deleted within a range of deletion times.

17. The system of claim 14, further comprising displaying the graphical user interface that includes a list of deleted electronic messages and includes user interface element for sorting the deleted electronic messages using the deleted property information and a user interface element for restoring deleted electronic messages using the deleted property information.

18. The method of claim 1, wherein the selected value corresponds to a geographic range of a location of the device where the one or more items were deleted.

19. The computer storage device of claim 9, wherein the selected value corresponds to a geographic range of a location of the device where the one or more items were deleted.

20. The system of claim 14, wherein the deleted property information further comprises a range surrounding the location where the one or more deleted items were deleted.

* * * * *